United States Patent [19]

Shiota et al.

[11] Patent Number: 4,943,854
[45] Date of Patent: Jul. 24, 1990

[54] VIDEO SURVEILLANCE SYSTEM FOR SELECTIVELY SELECTING PROCESSING AND DISPLAYING THE OUTPUTS OF A PLURALITY OF TV CAMERAS

[75] Inventors: Tsuneo Shiota; Soji Takeuchi, both of Hachioji, Japan

[73] Assignee: Chuo Electronics Co., Ltd., Tokyo, Japan

[21] Appl. No.: 273,119

[22] Filed: Nov. 17, 1985

Related U.S. Application Data

[63] Continuation of Ser. No. 86,248, Aug. 13, 1987, abandoned, which is a continuation of Ser. No. 873,744, Jun. 12, 1986, abandoned.

[30] Foreign Application Priority Data

Jul. 26, 1985 [JP] Japan ................................ 60-139750

[51] Int. Cl.$^5$ ............................................. H04N 7/18
[52] U.S. Cl. ..................................... 358/108; 358/342; 360/33.1
[58] Field of Search ................ 358/342, 108; 360/33.1

[56] References Cited

U.S. PATENT DOCUMENTS

| | | | |
|---|---|---|---|
| 3,935,380 | 1/1976 | Coutta | 358/108 |
| 4,051,524 | 9/1977 | Baxter | 358/108 |
| 4,120,004 | 10/1978 | Coutta | 358/108 |
| 4,142,209 | 2/2979 | Hedlund et al. | 358/342 |
| 4,237,483 | 12/1980 | Clever | 358/108 |
| 4,507,683 | 3/1985 | Gresslauber et al. | 358/108 X |
| 4,511,886 | 4/1985 | Rodriguez | 358/108 X |
| 4,630,110 | 12/1986 | Cotton et al. | 358/108 X |
| 4,673,974 | 6/1987 | Ito et al. | 358/108 |

FOREIGN PATENT DOCUMENTS 2060554  5/1979  Fed. Rep. of Germany ...... 358/108

OTHER PUBLICATIONS

"New CCTC Security Camera System for Easy Installation", Kuroda et al. Nat'l Technical Report, vol. 26, No. 1, Feb. 1986, pp. 155-162.
English Translation of CEC Multi-Video Recorder Brochure.

Primary Examiner—Aristotelis M. Psitos
Attorney, Agent, or Firm—Jordan and Hamburg

[57] ABSTRACT

The multi-video recorder incorporates a multiplexing means permitting selection of the video signal from each of plurality of TV cameras according to a predetermined importance or priority and a priority changed due to occurrence of a new event and transmission of the video image thus selected over a single line and recording it by a single video tape recorder by time shared multiplexing the video signal at every frame, field or unit of time. It also can reproduce or demultiplex the video signal recorded as multiplexed, with each designated TV camera or by sequentially selecting the video signal from each TV camera. The system also has a means for inserting in said time shared multiplexed video signal a control signal such as select information, event information, time information or the like, so it can selectively demultiplex the video signals recorded as multiplexed, as desired.

7 Claims, 2 Drawing Sheets

VIDEO SURVEILLANCE SYSTEM FOR SELECTIVELY SELECTING PROCESSING AND DISPLAYING THE OUTPUTS OF A PLURALITY OF TV CAMERAS

This application is a continuation, of application Ser. No. 086,248 filed Aug. 13, 1987, now abandoned. Which in turn is a continuation of application Ser. No. 873,744 filed Jun. 12, 1986, also abandoned.

BACKGROUND OF THE INVENTION

1. Field of the Invention

The present invention relates to a multi-video recorder intended for use in, for example, super-markets, banks, etc. in monitoring at many spots and in recording/reproducing the pictures of such spots.

2. Description of the Prior Art

Recently, increasingly many field including super-markets, banks, manufacturing plants, etc. have come to employ multiple TV cameras at various spots such as shops or counters, windows, automated production lines, etc., respectively, in order to monitor and record the pictures of such spots by switching the TV cameras sequentially from one to another at predetermined time intervals. In thee multi-video recorder systems used for the above-mentioned purposes, the picture signals from the TV cameras are sequentially selected and recorded usually into a single video tape recorder (will be referred to as "VTR" hereinafter) for a predetermined period of time (time shared recording).

In the conventional multi-video recorder system consisting of, for example, 10 units of TV cameras and one unit of VTR used in combination for monitoring at 10 spots and recording the pictures of such spots, assuming that one TV camera is to be in action for a time period of, for example, 3 sec, a TV camera once put into action for monitoring and recording is put into service for the same purpose in 30 sec. from its preceding service. That is, each camera can provide video information only for 30 sec. at intervals of 3 seconds, so that only discrete information can be obtained at the time of reproducing the recorded video information. Accordingly any event that occurred during recording by any other TV camera cannot be known. So, to solve this problem, it was necessary to reduce the number of TV cameras used in such multi-video recorder system.

Also there was a problem of taking a rather long time to select the video information from any one of the TV cameras at the time of picture reproduction for editing a series of monitoring video data.

SUMMARY OF THE INVENTION

Therefore, the object of the present invention is to overcome the above-mentioned drawbacks of the prior art by providing a multi-video recorder which can record the information (video signals) from multiple TV cameras as switched from one to another at very short intervals of time, reproduce the information from any selected TV camera, and provide selective monitoring of any important spots and any spots with any change in events.

The above object can be attained by providing according to the present invention, a multi-video recorder comprising a plurality of TV cameras, means permitting transmission by one line and recording by one VTR, the video signals from the plural TV cameras, by selecting the video signals according to the predetermined important and any importance changed by any external factor (occurrence of any event like movement or displacement of any object being monitored, etc.) and by time shared multiplexing the video signals at every frame, field or unit time. Means are also provided for selecting certain video signals from the signals thus recorded and reproducing them as still pictures or a series of sequential still pictures. In addition, means are provided of permitting the transmission of video signals with ID signals through the video signal transmission circuit by adding to the video signals (by inserting them in, for example, verticl blanking intervals) the ID signals such as select information (number for the TV camera having picked up the video signals), event information (information for applying an interrupt to change the importance), time information (date and hours of the recording) and to use the ID signal as ID information in demultiplexing time shared multiplexed video signal.

It should be noted that the term "recording (selection) according to the importance" used herein with reference to the equipment of the invention means recording with reduced number of recording frames for any event of a relatively slow motion or lower importance and with increased number of recording frames for any high speed or important event, which is contributed to the compact equipment design with necessary sufficient quality of picture.

The equipment of the invention permits recording and reproducing the picture as selected by the extremely short units such as frames or fields and also selecting them according to their importance and events, so that the impossibility of detecting any event having occurred while a TV camera for the spot in question is not selected can be reduced to such an extent that it cannot be any practical problem. Also the limitation in number of video signals (number of TV cameras installed) depending upon the intervals of selection is considerably eliminated.

These and other objects and advantages of the present invention will be better understood from the ensuing description made, by way of example, with reference to the drawings.

DETAILED DESCRIPTION OF THE PREFERRED EMBODIMENTS

Figure 2:
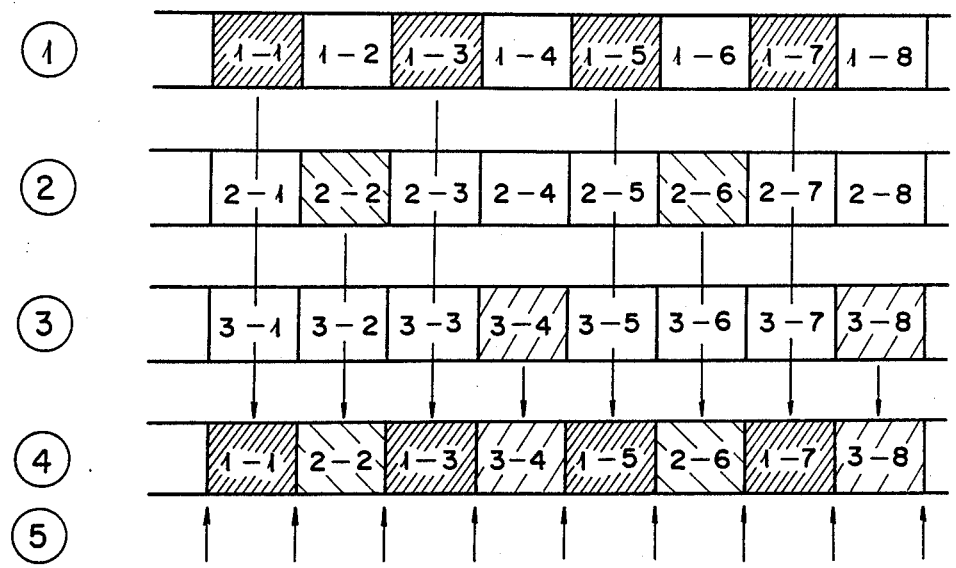
FIG. 2 explains the principle of the inventive time shared multiplexed recording.

FIG. 2 shows the principle of the time shared multiplexed recording according to the importance as previously described. For the simplicity of the description and illustration, an example in which eight sequential occuring frames of video signals from three Tv cameras are time shared multiplexed at each field will be taken herebelow. The circuled numerals (1) to (3) indicate the pictures (video signals) from the three TV cameras, respectively, and (4) inicates a picture time shared multiplexed by the equipment of the invention. That is, in the first frame, among the hatched portions in the pictures (1) to (3), the one in the picture (1) is the most important, while those in the pictures (2) and (3) are of lower importance. These parts are added together to synthesize the picture (4) which is to be recorded. The circled numeral (5) indicates the position of vertical sync signal.

The "change of importance" is such that when a door being monitored by a TV camera and to which a low importance is normally assigned is opened its importance is increased with the result that the door image is, more definitely recorded.

In the equipment of the invention, any change in video information can be flexibly accomodated by making it possible to change the importance of any door picture by the input from the sensors such as door switch, proximity switch, etc.

The present invention will be described in more detailed with reference to an embodiment thereof.

Figure 1:
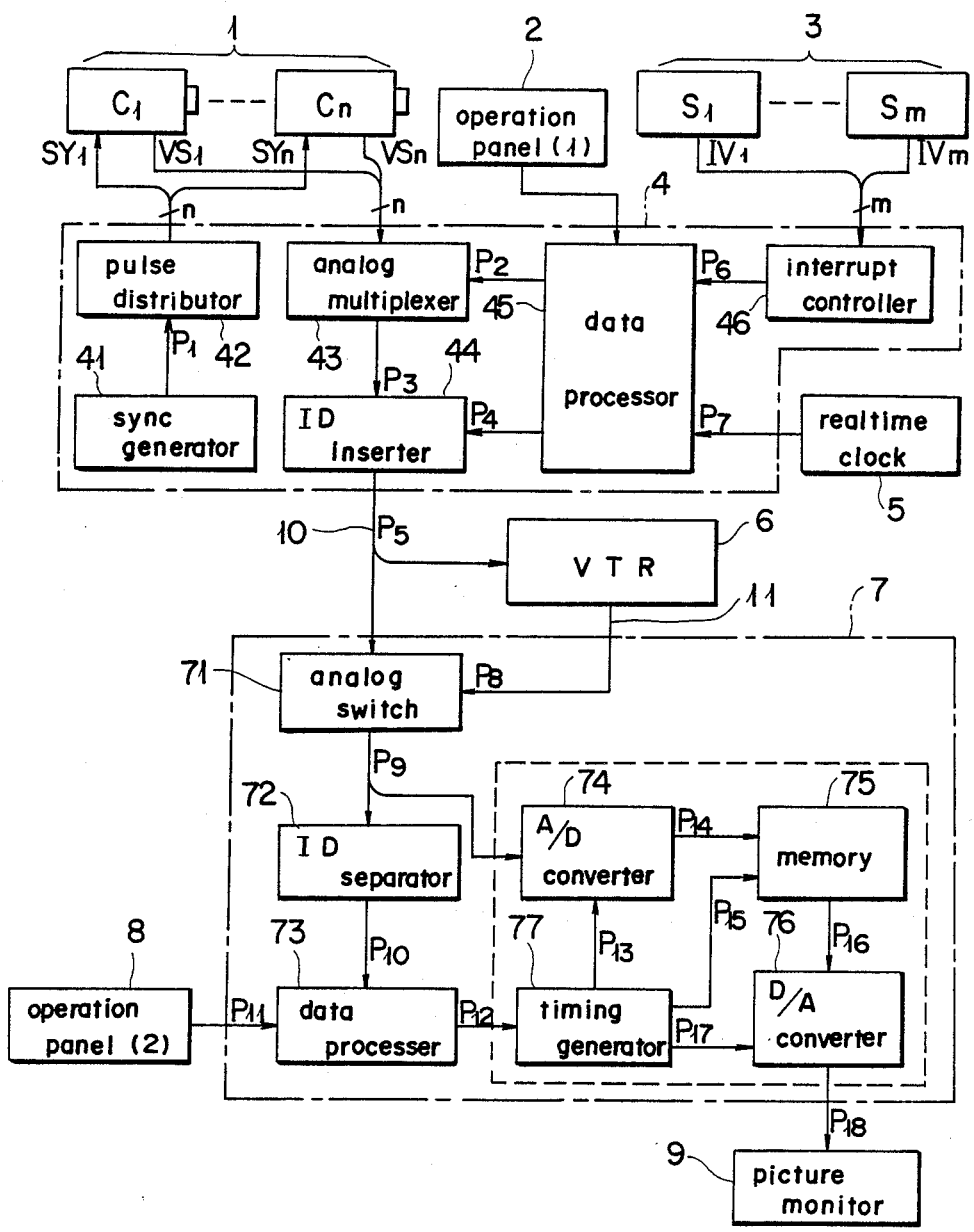
FIG. 1 is a block diagram showing one embodiment of the multi-video recorder according to the present invention.

FIG. 1 is a block diagram showing one embodiment of the multi-video recorder of the invention consisting of the following nine blocks as shown in Figure.

Namely, the multi-video recorder comprises a picture source I having a plurality of TV cameras $C_1$ to $C_n$: operation panel (1) 2 for automatic selection of any of the plural TV cameras according to their importance; sensor 3 including a plurality of sensors $S_1$ to $S_m$ to detect any event (interrupt factor) due to which the importance is to be changed; multiplexer 4; real time clock 5 which supplies the multiplexer 4 with time information; VTR 6 to record the time shared multiplexed signal provided by the multiplexer 4; demultiplexer 7; operation panel (2) 8 which delivers select command for selecting a video signal to be demultiplexed; and a picutre monitor 9. The multiplexer 4, VTR 6 and demultiplexer 7 are interconnected by means of signal line 10, while the VTR 6 and demultiplexer 7 are connected to each other by signal line 11.

The above-mentioned multiplexer 4 consists of the following circuits: sync generator 41 to generate video sync signal as reference signal; pulse distributor 42; analog multiplexer 43 to select a single video signal from a number n of input video signals; ID inserter 44 which inserts in the video signal ID information such as time information, event information, select information, etc.; data processor 45; and interrupt controller 46 to detect interrupt signal from the The demultiplexer 7 consists of the following: analog switch 71 (manually-operable select switch, for example) to select either the timme shared multiplexed video signal transmitted through the signal line 10 or the one transmitted from the VTR 6 through the signal line 11; ID separator 72 to separate ID information inserted in the video signal; data processor 73 which receives information signal from the ID separator 72 and select command from the operation panel (2) 8 for use in designating a TV camera from which picture data are to be read, and processes the data; A/D convertr 74; memory 75 (semiconductor memory, for example) of one frame capacity; D/A converter 76 to convert digital video signal from the memory 75 into an analog video signal for transmission to the picture monitor 9; and a timing generator which, upon receiving a write command from the data processor 73, indexes a frame (picture). The block composed of said circuits from the A/D converter 74 to the timing generator 77 is called "frame memory".

The multi-video recorder of the above-mentioned construction according to the present invention functions as follows:

The pulse distributor 42 distributes sync signal $P_1$ generated in the TV sync generator 41 as sync signals $SY_1$ to $SY_n$ to the TV cameras $C_1$ to $C_n$, respectively, in the picture source 1. The TV cameras $C_1$ to $C_n$ provide video signals $VS_1$ to $VS_n$ synchronous with the sync signals $SY_1$ to $SY_n$, respectively.

The analog multiplexer 43 provides time-division multiplexed video signal by sequentially selecting a single video signal $P_3$ among th video signals $VS_1$ to $VS_n$ at every frame or field according to the select signal $P_2$ delivered from the data processor 45 at every frame or field.

Figure 3:
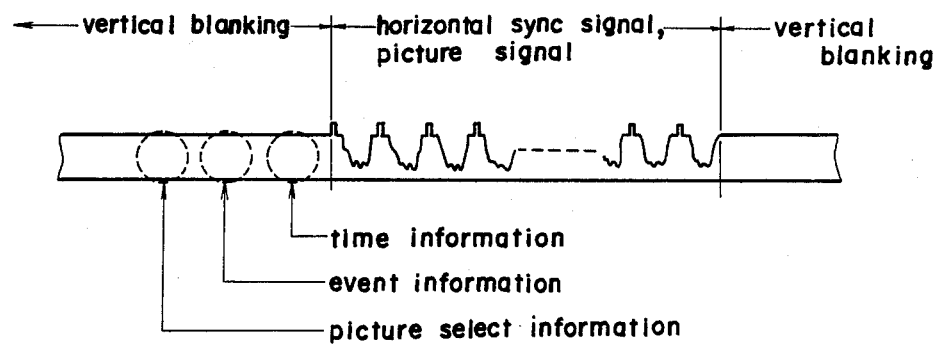
FIG. 3 is also an explanatory diagram of time shared multiplexed video signal in the present invention.

The ID inserter 44 produces an output signal (time shared multiplexed video signal) $P_5$ by inserting in the vertical blanking interval of a video signal the ID signals $P_4$ such as time information, event (interrupt) information, select information (camera ID signal), etc. delivered from the data processor 45, as shown in FIG. 3.

The interrupt controller 46 detects any of interrupt signals $IV_1$ to $IV_m$ generated by the sensors $S_1$ to $S_m$, and transmits an event information $P_6$ (interrupt information) to the data processor 45.

The data processor 45 receives preset importance data from the operation panel (1) 2, time information $P_7$ (time-keeping data) from the realtime clock 5, and event information $P_6$ (interrupt information) from the interrupt controller 46 and produces select information $P_2$ which is applied to the analog multiplexer 43, an ID signals $P_4$ such as time information, event information (interrupt signal), select information (camera ID signal), etc. which is applied to the ID inserter 44, according to the importance and any changed importance.

The time shared multiplexed video signal $P_5$ produced in the ID inserter 44 is transmitted as the output signal $P_5$ (time shared multiplexed video signal) of the multiplexer 4 to the VTR 6 where it is used as a recording and a simultaneous monitoring signal.

The analog switch 71 selects either the output signal $P_5$ (time shared multiplexed video signal) from the multiplexer 4 or the time shared multiplexed video signal $P_8$ from the VTR 6 and delivers an input signal $P_9$ to the ID separator 72 and A/D converter 74.

The ID separator 72 separates from the input signal $P_9$ the ID signal (informative signal $P_{10}$) such as time information, event information, select information, etc. and delivers it to the data processor 73.

The data processor 73 compares a select commnad $P_{11}$ from the operation panel (2) 8 operated by an operator to select new matter, a video signal delivered from any one of the TV cameras ($C_1$ to $C_n$), the select signal being among the input video signals $P_9$ time shared multiplexed, with the selected information among the information signals $P_{10}$, and delivers a write command $P_{12}$ to the timing generator 77 when there is a correspondence betwen these signals.

The A/D converter 74 converts input signal $P_9$ as analog input into a digital video signal $P_{14}$ in reponse to a timing signal $P_{13}$ from the timing generator 77.

The memory 75 is provided to store the digital video signals for one field or frame, and it writes data in only the field or frame for which a write signal $P_{15}$ generated by the timing generator 77 is available due to write command $P_{12}$ for a certain field or frame, which is produced by the data processor 73, among th digital video signals $P_{14}$ suppled as input.

The D/A converter 76 receives as digital input the digital video signal $P_{16}$ with which the contents of the memory 75 have been read, and produces a video signal $P_{18}$ in the form of an ordinary video signal according to the timing signal $P_{17}$ from the timing generator 77.

The D/A converter 76 always delivers to the picture monitor 9 the contents of the memory 75 as video signal $P_{18}$; however, since the write into the memory 75 is effected only when the select information inserted in the input signal $P_9$ coincides with a select command $P_{11}$ set by the operation panel (2) 8, a determined one of the time shared multiplexed video signals is displayed as a still picture or a series of sequential still pictures on the picture monitor 9.

Needless to say, such data as time information, event information, etc. among the ID signal (informative signal $P_{10}$) separated from the input signal $P_9$ can be used in controlling the write into the memory 75.

As described in the foregoing, the multi-video recorder of the invention permits transmission of plural video signal through a single line and recording them by a single VTR by time shared multiplexing them at every frame, field or unit of time whereby a larger number of TV cameras can be installed than ever for more detail monitoring at more spots.

Also, information from any desired TV camera can be selectively reproduced for detail monitoring.

Furthermore, any important spot or any spot where any change has occured in event can be selectively monitored, so there will be hardly any case in which any event having occurred while the TV camera at a sport is not selected is not recorded and which thus will cause any subsequent problem.

What is claimed is:

1. A multi-video surveillance system for the surveillance of a plurality of positions, comprising:

a plurality of TV cameras for producing a plurality of first video signals corresponding to scenes of said positions;

control means for sequentially selecting the outputs of said TV cameras to produce a single video output signal, said control means comprising means for controlling the relative information content of each of said first video signals presents in said second video output signal;

sensing means for producing output signals in response to the determination of the occurrence of non-occurence of a predetermined physical event at least one of said positions;

data processing means responsive to said input signals of said sensing means to provide output signals for controlling said means for controlling the relative information content to change the relative information content of said first video signals present in said second video output signal;

said means for controlling said relative information content being responsive to said output signals of said data processing means for sequentially selecting relative numbers of field, frame or multiple frame video signal outputs of each of said TV cameras in a first predetermined proportion, means for producing first time-division multiplex signals therefrom in which the relative information content from each of said TV cameras is a function of said first predetermined proportion, and means responsive to the output of said sensing means for changing the relative numbers of field, frame or multiple frame video signal outputs;

said means for producing first time-division multiplex signals further comprising means for adding control signals to said first time-division multiplex signals to produce second time-division multiplex signals, said control signals comprising signals associated with the fields for identifying the respective TV cameras, relative information content of the first video signals and information corresponding to the output signals of said sensing means, whereby said second time-division multiplex signals are comprised of sequential field, frame or integral number of frame signals each derived from the respective TV cameras in a proportion controlled by said means for controlling said relative information content;

video recording means for recording said second time-division multiplex signals;

selection means for producing second selection signals corresponding to desired surveillance information;

means for reproducing signals corresponding to still scenes or series of continuous still scenes, said reproducing means comprising means for comparing said second selection signals with control signals on said second time-division multiplex signals for selecting desired scene signals from said second time-division multiplex signals; and display means for displaying scenes corresponding to the signals reproduced by the reproducing means;

said reproducing means comprising an input selection circuit, said input selection circuit comprising means for selectively applying the output of said means for adding control signals or the output of said video recording means to said reproducing means, whereby the display means can selectively display current scenes or scenes recorded by said video recording means.

2. A multi-video surveillance system for the surveillance of a plurality of positions, comprising:

a plurality of TV cameras for producing first video signals corresponding to scenes of said positions;

multiplexing means for combing said first video signals to produce time-division multiplexed second video signal;

sensing means for producing output signals in response to the determination of the occurrence or non-occurrence of a predetermined physical event at least one of said positions;

data processing means comprising means for controlling said multiplexing means to sequentially select relative numbers of field, frame or multiple frame video signal outputs of each of said TV cameras to control the relative information content thereof in said second video signal, said data processing means further caomprising means for controlling said multiplexing means to change the relative information content from each of said TV cameras in said second video signals in response to the output signals of said sensing means;

means for adding control signals to said time-division multiplexed second video signal to produce third time-division multiples video signals, said control signals comprising signals associated with the fields for identifying the respective TV camera, the relative information content in said second video signals derived from said first video signals, and information corresponding to the output signals of said sensing means, whereby said third time-division multiplex video signals are comprised of sequential field, frame or integral numbers of frame signals each derived from the respective TV cameras;

video recording means for recording said third time-division multiplex signals;

selection means for producing selection signals corresponding to desired surveillance information;
means for reproducing signals corresponding to still scenes or series of continuous still scenes, said reproducing means comprising means for comparing said selection signals with control signals on said third time-division multiplex signals for selecting desired scene signals from said third time-division multiplex signals; and
display means for displaying scenes corresponding to the signals reproduced by the reproducing means;
said reproducing means comprising an input selection circuit, said input selection circuit comprising means for selectively applying the output of said means for adding control signals or the output of said video recording means to said reproducing means, whereby the display means can selectively display current scenes or scenes recorded by said video recording means.

3. A multi-video surveillance system for the surveillance of a plurality of positions, comprising:
a plurality of TV cameras for producing first video signals corresponding to scenes of said positions;
multiplexing means for combining said first video signals to produce time-division multiplexed second video signal;
sensing means for producing output signals in response to the determination of the occurrence or non-occurrence of a predetermined physical event at at least one of said positions;
operator input means for producing first control signals;
data processing means comprising means for controlling said multiplexing means to sequentially select relative numbers of field, frame or multiple frame video signal outputs of each of said TV cameras to control the relative information content thereof in said second video signal in response to said first control signals, said data processing means further comprising means for controlling said multiplexing means to change the relative information content from each of said TV cameras in said second video signals in response to the output signals of said sensing means;
means for adding second control signals to said time-division multiplexed second video signal to produce third time-division multiplex video signals, said second control signals produced by the data processing means comprising signals associated with the fields for identifying the respective TV camera, the relative information content in said second video signals derived from said first video signals, and information corresponding to the output signals of said sensing means, whereby said third time-division multiplex video signals are comprised of sequential field, frame or integral numbers of frame signals each derived from the respective TV cameras;
video recording means for recording said third time division multiplex signals;
selection means for producing selection signals corresponding to desired surveillance information;
means for reproducing signals corresponding to still scenes or series of continuous still scenes, said reproducing means comprising means for comparing said selection signals with second control signals on said third time-division multiplex signals for selecting desired scene signals from said third time-division multiplex signals; and
display means for displaying scenes corresponding to the signals reproduced by the reproducing means;
said reproducing means comprising an input selection circuit, said input selection circuit comprising means for selectively applying the output of said means for adding control signals or the output of said video recording means to said reproducing means, whereby the display means can selectively display current scenes or scenes recorded by said video recording means.

4. A multi-video surveillance system for the surveillance of a plurality of positions, comprising:
a plurality of TV cameras for producing first video signals correspond to scenes of said positions;
a source of first control signals;
multiplexing means for combining said firt video signals to produce time-division multiplexed second video signal;
data processing means comprising scene selecting means for controlling said multiplexing means to sequentially select relative numbers of field, frame or multiple frame video signal outputs of each of said TV cameras to control the relative numbers of field, frame or multiple frame video signal outputs in said second video signal, said data processing means further comprising means for controlling said multiplexing means to change the relative numbers of field, frame or multiple frame video signal outputs of each of said TV cameras in said second video signals in response to said first control signals;
means for adding second control signals to said time-division multiplexed second video signal to produce third time-divisionl multiplex video signals, said second control signals comprising signals associated with the fields for identifying the respective TV camera, whereby said third-division multiplex video signals are comprised of sequential field, frame or integral numbers of frame signals each derived from the respective TV cameras;
video recording means for recording said third time-division multiplex signals;
selection means for producing selection signals corresponding to desired surveillance information;
means for reproducing signals corresponding to still scenes or series of continuous still scenes, said reproducing means comprising means for comparing said selection signals with said second control signals on said third time-division multiplex signals for selecting desired scene signals from said third time-division multiplex signals; and
display means for displaying scenes corresponding to the signals reproducing by the reproducing means.

5. The multi-video surveillance system of claim 4 wherein said source of said first control signals comprises sensing means for producing output signals in response to the determination of the occurence or non-occurrence of a predetermined physical event at at least one of said positions.

6. The multi-video surveillance system of claim 4 wherein said source of said first control signals comprises keyboard selection means coupled to said data processing means.

7. A multi-video surveillance system for the surveillance of a plurality of positions, comprising:

a plurality of TV cameras for producing a plurality of first video signals corresponding to scenes of said positions;

control means for sequentially selecting the outputs of said TV cameras to produces a single second video output signal, said control means comprising means for controlling the relative information content of each of said first video signals present in said second video output signal;

sensing means for producing output signals in response to the determination of the occurrence or non-occurrence of a predetermined physical event at at least one of said positions;

data processing means responsive to said output signals of said sensing means to provide output signals for controlling said means for controlling the relative information content to change the relative information content of said first video signals prevent in said second video output signal;

said means for controlling said relative information content being responsive to said output signals of said data processing means for sequentially selecting relative numbers of field, frame or multiple frame video signal outputs of each of said TV cameras in a first predetermined proportion, means for producing first time-division multiplex signals therefrom in which the relative information content from each of said TV cameras is a function of said first predetermined proportions, and means responsive to the output of said sensing means for changing the relative numbers of field frame or multiple frame video signal outputs while still sequentially selecting a positive number of field, frame or multiple frame video signal outputs from a pluralityof said TV cameras;

said means for producing first time-division multiplex signals further comprising means for adding control signals to said first time-division multiplex signals to produce second time-division multiplex signals, said control signals comprising signals associated with the fields for identifying the respective TV camera, relative information content of the first video signals and information corresponding to the output signals of said sensing means, whereby said second time-division multiplex signals are comprised of sequential field, frame or integral number of frame signals each derived from the respective TV cameras in a proportion controlled by said means for controlling said relative information content;

video recording means for recording said second time division multiplex signals;

selection means for producing second selection signals correspond to desired surveillance information;

means for reproducing signals corresponding to still scenes or series of continuous still scenes, said reproducing means comprising means for comparing said second selection signals with control signals on said second time-division multiplex signals for selecting desired scene signals from said second time-division multiplex signals; and display means for displayng scenes corresponding to the signals reproduced by the reproducing means;

said reproducing means comprising an input selection circuit, said input selection circuit comprising means for selectively applying the output of said means for adding control signals or the output of said video recording means to said reproducing means, whereby the display means can selectively display current scenes or scene recorded by said video recording means.

* * * * *

UNITED STATES PATENT AND TRADEMARK OFFICE
CERTIFICATE OF CORRECTION

PATENT NO. : 4,943,854

DATED : July 24, 1990

INVENTOR(S) : Tsuneo Shiota and Soji Takeuchi

It is certified that error appears in the above-identified patent and that said Letters Patent is hereby corrected as shown below:

On the title page, item [54] and in column 1, line 3, after "SELECTING" insert --,--; and Item [22] Filed: "Nov. 17, 1985" should read --Nov. 17, 1988--.

Signed and Sealed this

Eleventh Day of February, 1992

Attest:

HARRY F. MANBECK, JR.

Attesting Officer

Commissioner of Patents and Trademarks